Figure 1:
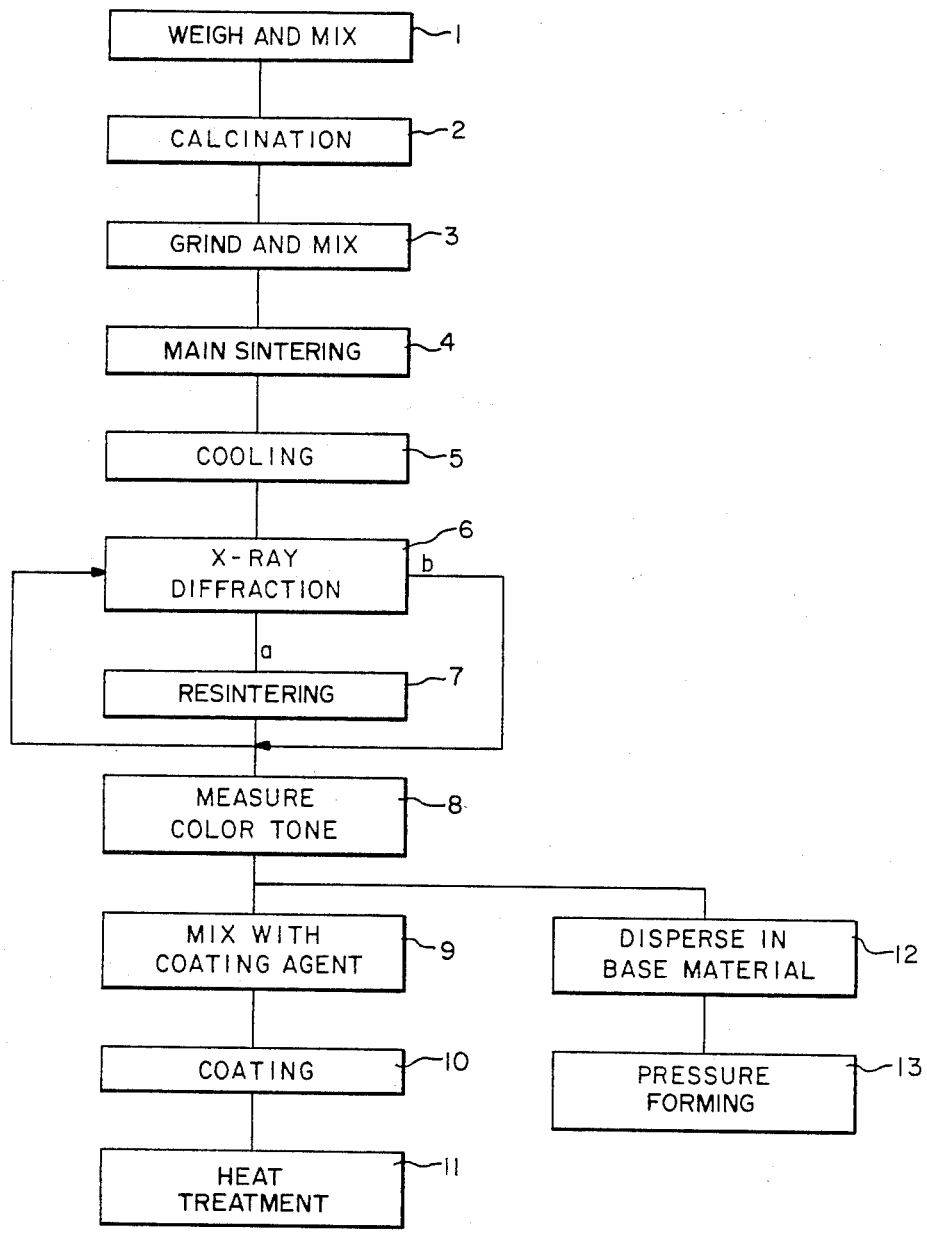

United States Patent [19]

Kobayashi et al.

[11] Patent Number: 4,722,510

[45] Date of Patent: Feb. 2, 1988

[54] REVERSIBLE TEMPERATURE INDICATING MATERIALS

[75] Inventors: Yukiko Kobayashi, Kashiwa; Yoshio Inoue, Matsudo; Toshihiko Takano, Kashiwa; Shigeo Harada, Moriyamachi, all of Japan

[73] Assignee: Sharp Kabushiki Kaisha, Osaka, Japan

[21] Appl. No.: 855,632

[22] Filed: Apr. 25, 1986

[30] Foreign Application Priority Data

May 30, 1985 [JP] Japan .................................. 60-119108

[51] Int. Cl.$^4$ ............................................ G01N 31/00
[52] U.S. Cl. .................................................. 252/408.1
[58] Field of Search ............................ 252/408.1, 462; 501/126, 132; 106/105, 286.2, 286.8, 288 B, 302; 75/70

[56] References Cited

U.S. PATENT DOCUMENTS

| | | | |
|---|---|---|---|
| 4,059,341 | 11/1977 | Zeller | 252/408.1 |
| 4,110,259 | 8/1978 | Sichel | 252/408.1 |
| 4,150,879 | 4/1979 | Bayard | 252/408.1 |
| 4,529,448 | 7/1985 | Köhler et al. | 106/288 B |
| 4,563,220 | 1/1986 | Köhler et al. | 106/288 B |
| 4,598,979 | 7/1986 | Sugiuchi et al. | 252/408.1 |

Primary Examiner—Deborah L. Kyle
Assistant Examiner—T. J. Wallen
Attorney, Agent, or Firm—Flehr, Hohbach, Test, Albritton & Herbert

[57] ABSTRACT

A reversible temperature indicating material which is chemically stable, is not harmful and can be produced relatively inexpensively contains as principal component a polycrystalline bismuth-chromium oxide substance produced by firing a mixture with 50–86 molar % of bismuth-containing compounds and 50–14 molar % of chromium-containing compounds.

3 Claims, 5 Drawing Figures

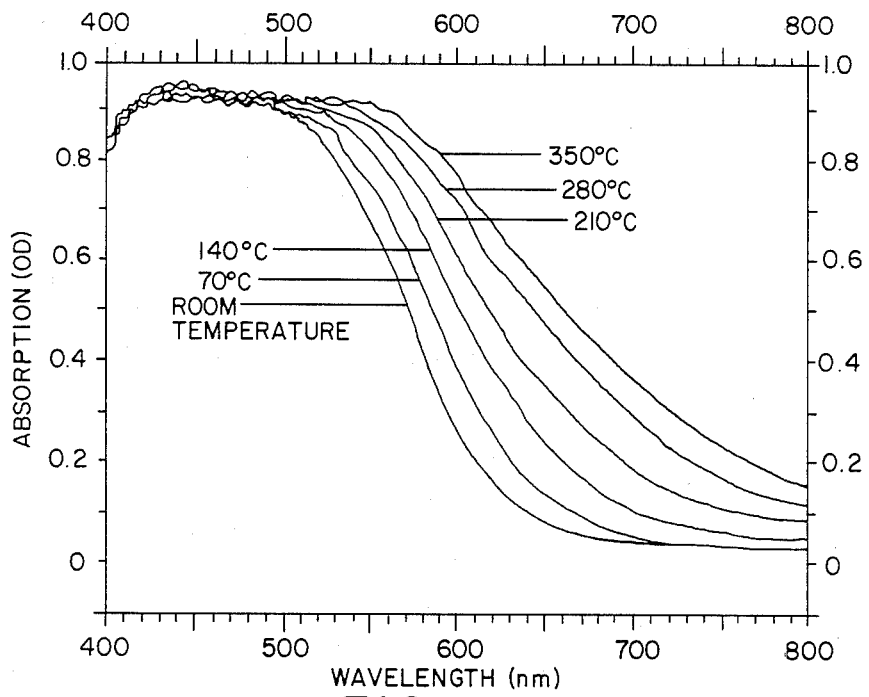
FIG.—4
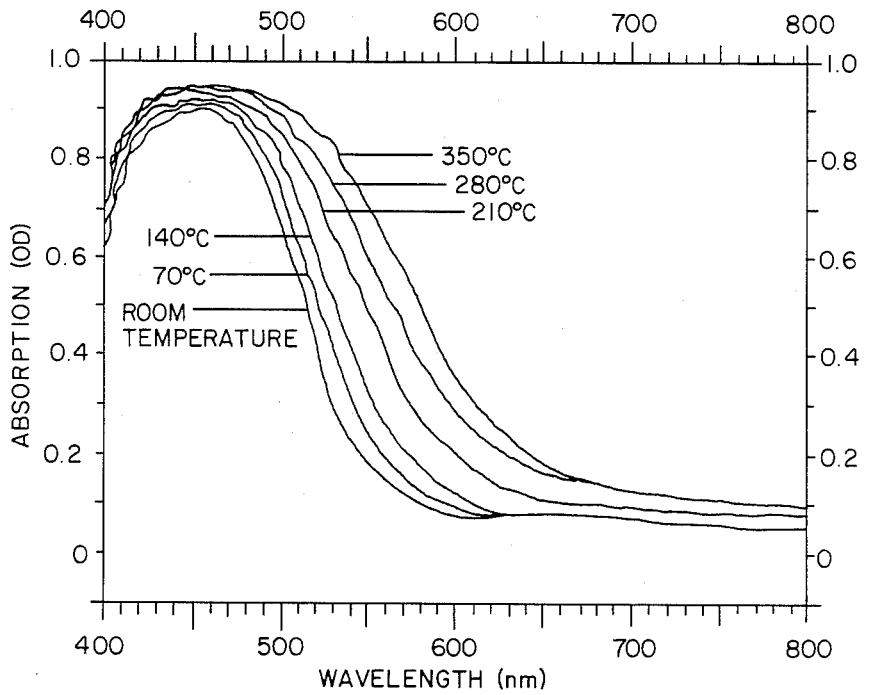
FIG.—5

REVERSIBLE TEMPERATURE INDICATING MATERIALS

This invention relates to reversible temperature indicating materials which are a kind of temperature sensitive materials having different color tones depending on temperature.

In the past, temperature indicating materials were mainly used industrially for transformers, power transmission and distribution equipment, control devices related to power plant electrical machines and motors. Use was made mostly, however, of heat-sensitive paint which changes its color tone irreversibly and the user visually observed changes in the color of the paint to understand the thermal history of an equipment or a device and to detect hot spots, etc.

Recently, on the other hand, reversible temperature sensitive materials are being developed as a kind of temperature indicating material. Since these materials can change colors repeatedly, attempts are being made to use them for indicating temperature in all kinds of production processes involving thermal cycles such as heating, exothermic steps and cooling and as a warning display in the case of overheating of an outer wall of a burning apparatus such as a household stove or for preventing a careless contact with a flameless cooking device such as a microwave oven and a hot plate.

Among the characteristics required of such reversible temperature indicating materials, although they depend on the purpose for which use will be made, are the following:

(1) changes in color tone should be reversible,
(2) the repetition lifetime should be sufficiently long,
(3) the changes should be clear enough to be visually discernible,
(4) the changes should occur at temperatures 70°–80° C.,
(5) the material should be stable at tempratures up to 400°–450° C.,
(6) the changes in color tone should dependably follow the changes in temperature,
(7) the material should have good affinity with paints, glass and ceramics, and should be processable.
(8) the change should be from a cold tone to a warm tone as temperature rises because the visual sense of the observer must be depended upon,
(9) the material should be stable against moisture in the atmosphere as well as ultraviolet beams and strong against the environment forces in general,
(10) the material should not contain substances which are harmful to humans or animals, and
(11) the material itself should be inexpensive and its production cost should also be low.

As can be seen in the list above, the conditions to be satisfied are greatly varied and it is extremely difficult to come across a material which satisfies all of these itemized conditions. Previously considered substances such as the mixture of silver iodide, silver sulfide, and zinc sulfide and the mixture of bismuth oxide and potassium iodide do satisfy these conditions to some degrees and have successfully added desirable characteristics to materials.

It should be noted that these materials have been developed mainly for the purpose of attaching them to household cooking apparatus such as ovens, heaters and microwave ovens. Thus, if a material is such that an ordinary user of such household apparatus would have to be warned to exercise special care because of the use therewith of this material, such a material is of little value and should be avoided. In other words, the user may not appreciate the value of a safety device unless it also adds convenience to a significant degree. Of the conditions itemized above, items (9), (10) and (11) are particularly based on such considerations. Previously considered materials have superior color-changing characteristics but are disadvantageous because they fail to satisfy the conditions (9) and (11) in particular.

It is therefore an object of this invention in view of the above to provide reversible temperature indicating materials by using chemically stable, inexpensive metallic oxides.

The above and other objects of this invention are achieved by providing reversible temperature indicating materials which have as their principal component a polycrystalline substance produced by firing a mixture with 50–86 molar % of bismuth-containing compounds and 50–14 molar % of chromium-containing compounds.

The accompanying drawings, which are incorporated in and form a part of the specification, illustrate a few embodiments of the present invention and, together with the description, serve to explain the principles of the invention. In the drawings:

FIG. 1 is a process flow chart for the synthesis of reversible temperature indicating materials of this invention, and FIGS. 2 through 5 are graphs showing the temperature dependence of absorption spectra of test samples according to the present invention in the visible range of wavelength.

In what follows, a detailed account is presented of an example of reversible temperature indicating material embodying the present invention. Stated briefly, this exemplary material is manufactured basically by firing in air and at the temperature between 550° C. and 900° C. a mixture with 50–86 molar % of bismuth-containing compounds such as oxides, hydroxides, halides, nitrates and organic compounds and 50–14 molar % of chromium-containing compounds to obtain bismuth-chromium oxide polycrystals and causing these polycrystals of bismuth-chromium oxide either to directly become mixed and dispersed in glass or ceramic or to become uniformly dispersed in a glass coating material or the like and applied onto the surface of a target object.

Basic characteristics of the aforementioned polycrystals of bismuth-chromium oxide as well as the characteristics related to their various processing forms are as follows:

(1) According to optical measurements with a spectral photometer, the phenomenon of color changes is detected from 70° C. A clear change in color detectable by visual observation takes place at 150° C.

(2) The color tone can be selected freely within a certain compositional range by varying the ratio between bismuth and chromium compositions. If bismuth and chromium are both at 50 molar %, it is green at room temperature and changes to bright yellow at a temperature over 140° C. If bismuth is at 86 atomic % and chromium is at 14 molar %, it is orange at room temperature and changes to dark red at a temperature over 140° C. In other words, as the bismuth component increases and the chromium component decreases, a reflection shift take place in the direction of longer wavelengths both before and after temperature is increased. It goes without saying that color changes are reversible in all cases, independently of the composition.

(3) The aforementioned polycrystals of the bismuth-chromium oxide are stable up to about 850° C. within the aforementioned compositional range. They can follow temperature changes dependably and their repetition lifetimes are sufficiently long. They are not soluble in cold or warm water and no transmutation occurs under ultraviolet irradiation wavelength 254 nm.

(4) Since the aforementioned polycrystals of bismuth-chromium oxide are stable both thermally and chemically, they can be directly mixed and dispersed in glass, ceramic, asbestos, metallic, plastic and cement materials. In other words, it is possible to disperse them in molten glass, to form a product by uniformly dispering them in a ceramic powder or by mixing them with an asbestos material, to mix them with a molten metal with a relatively low melting point if necessary, to form a product by dispersing them inside a heat-resistive plastic material, to mix them in cement, etc. Moreover, they can be dispersed in all sorts of glass coating materials, silicon resins, thermosetting resins, organic dispersants, etc. and used for coating an object of which temperature is to be measured.

A reversible temperature indicating material according to the present invention can be synthesized by a process shown by FIG. 1. Reference being made hereunder to FIG. 1, specified amounts of bismuth compounds and chromium compounds are sufficiently ground and uniformly mixed together (Step 1). This mixture is the basic material to start with. The compounds may be oxides, hydroxides, halides, nitrates or organic compounds. Next, the starting material is placed inside a crucible for calcination in air at about 550° C. for 24 hours (Step 2). Thereafter, the calcined product is taken out and reground, and the process of uniform mixing as done before is repeated (Step 3). In a test experiment, this step was carried out so as to reduce the granular diameters to less than 37 μm. The product is placed in the crucible again for a main firing process for about 48 hours in air at 800° C. (Step 4) and taken out after a cooling period (Step 5). The cooling may be by furnace cooling. Although three cooling methods were tried (fast cooling, slow cooling at 8° C./hour and furnace cooling at about 200° C./hour) and the samples obtained by these different cooling methods were tested with an x-ray diffractometer and a spectral photometer, no substantially effective difference could be ascertained regarding formation and dependency of color tone on temperature. If the cooling is started from 900° C., however, the color change characteristics of the quickly cooled sample becomes less clear although the x-ray diffraction tests did not show any significant differences among the samples.

As mentioned above, the reversible temperature indicating materials of the present invention are not water-soluble. The presence of hexavalent chromium (such as $CrO_3$) which is highly toxic to human body was carefully examined during the production process but the results was always negative.

The production process outlined by the flow chart of FIG. 1 will be further explained in detail in connection with the following two examples.

EXAMPLE 1

Figure 2:
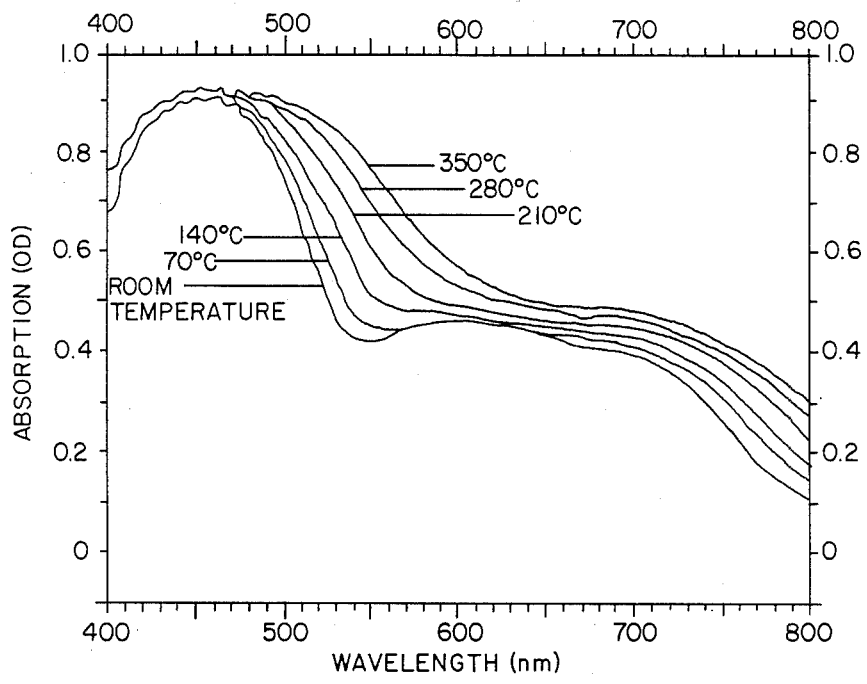
Figure 3:
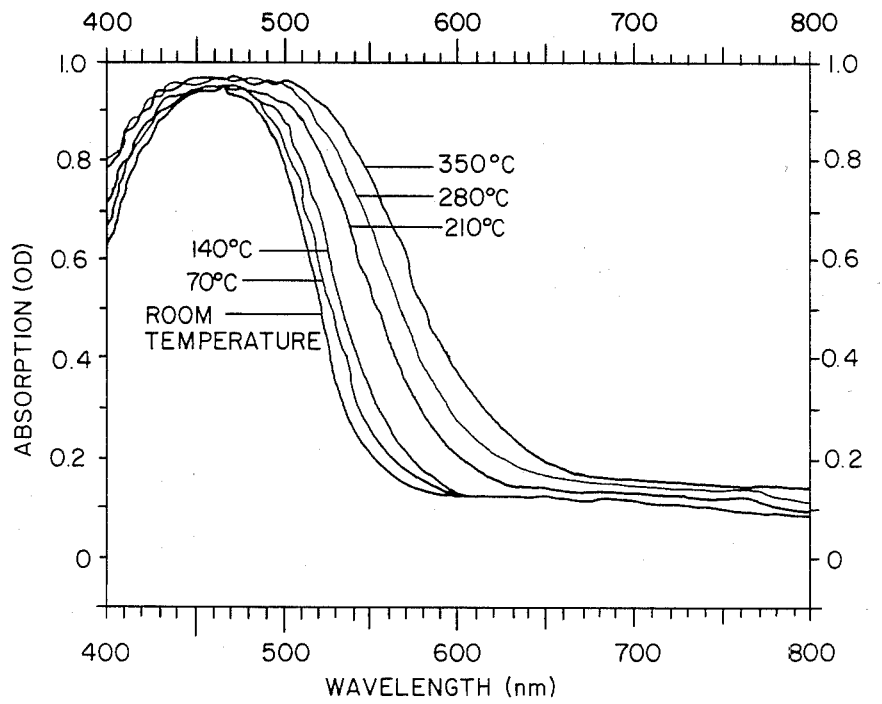

Reagent-grade $Bi_2O_3$ and $Cr_2O_3$ are weighed and samples each having a total weight of 50 g are prepared. Their compositions are as shown in Table 1, such that the molar % of $Bi_2O_3$ varies from 50 to 86, or that the molar % of $Cr_2O_3$ varies from 50 to 14. After each sample mixture is sufficiently ground and mixed by using a ball mill or an automatic mortar (Step 1), it is placed inside a porcelain crucible for calcination in air at 550° C. for 24 hours (Step 2). After the product is reground (Step 3), it is refired at 800° C. for 48 hours (Step 4) and is then cooled (Step 5). An x-ray diffractometer is used on the resultant powder material to ascertain that the original $Bi_2O_3$ and $Cr_2O_3$ phases have disappeared (Step 6). If the original phases are still observable (a), the firing process is repeated at 800° C. (Step 7). If they are not observable (b), no additional firing is effected. Next, a portion of the powder is pulverized by using an agate mortar and powder with granular diameters between 25 μm and 37 μm is obtained by using two sieve means. This powder sample is for testing the temperature dependence of its color tone by optical measuremens (Step 8). So, use is made of a pyrex glass plate of thickness 0.8 mm with a circular indentation of about 15 mmφ at the center section and an appropriate amount of this powder sample is placed in this indented section and gently pressed from above by a slide glass such that a flat surface is formed. This is presented as a test sample and placed on top of a hot plate for optical measurements to measure its absorption spectrum in the visible range. Temperature control for this purpose was effected by means of a linear thermocouple inserted through a hole penetrating from a side surface section of the hot plate to directly under the center section. The sample temperature was measured by a sheet-like thermocouple tightly affixed to a pyrex glass surface near the sample. A spectral photometer was used to measure absorption spectrum in the visible range at room temperature, 70° C., 140° C., 210° C., 280° C. and 350° C. Measurements were taken at these temperatures after it was ascertained that thermal equilibrium had been reached. The so-called 0°-0° regular reflection method with Y-shaped optical fibers was used for the measurements. Results of measurements on Samples 1, 4 and 6 are shown in FIGS. 2, 3 and 4, respectively. Color tones visually observed by the present inventors at room temperature and 140° C. are presented also in Table 1.

TABLE 1

| | Composition | | | Color Tone | |
|---|---|---|---|---|---|
| Sample | $Bi_2O_3$ (g) | $Cr_2O_3$ (g) | $Bi_2O_3$ (molar %) | Room Temperature | 140° C. |
| 1 | 37.7 | 12.3 | 50 | Green | Yellow |
| 2 | 43.0 | 7.0 | 67 | Green-Yellow | Orange-Yellow |
| 3 | 44.0 | 6.0 | 71 | Yellow | Orange |
| 4 | 45.1 | 4.9 | 75 | Bright Yellow | Red |
| 5 | 46.2 | 3.8 | 80 | Orange-Yellow | Scarlet |
| 6 | 47.4 | 2.6 | 86 | Orange | Dark Red |

Next, a method of forming a coated film of a reversible temperature indicating material on a substrate of glass, ceramics, aluminum or the like is described. To start, the sample is ground into a powder form with granular diameters 37 μm or less. To this powder is added a small amount of glass ceramic coating agent in the form of a solution having a metal alkoxide as the starting material and the mixture is kneaded (Step 9). In this step, care must be taken not to add the coating agent more than necessary for the kneading because an excessive amount of coating agent makes the material easier to peel off from the substrate when it is heated for affixing. For this reason, a preferable method is by slow titration of this solution onto the powder while the mixture is kneaded.

This mixture is placed on a spatula and applied on the surfaces of a glass aventurine plate which is preliminarily processed with alumina granules of about 60 μm, an alumina plate and an unglazed, unprocessed ceramic plate, and the spatula is pulled suddenly with the mixture pressed forcefully so that a film of coating with a flat top surface can be obtained on each substrate (Step 10). A firmly adhering film is obtained by heating this coating film at 150° C. for 30 minutes (Step 11). Although it is difficult with the method described above to control the thickness of the produced film or to obtain a smooth surface, the film thickness can be kept within the range between about 60 and 80 μm by keeping both the amount of mixture and the coating area constant. Besides the method of forming a coating film described above, a method with a roller is advantageous for mass production. If an alcohol-type solvent such as isopropyl alcohol, a surface active agent or a viscosity controlling agent is appropriately added to the aforementioned coating agent, use may be made of a spraying method, a brushing method or a dipping method.

EXAMPLE 2

Use was made of reagent-grade $Bi(OH)_3$ and $CrF_3.3H_2O$ to prepare a sample corresponding to Sample 4 of Table 1 with 41.4 g of $Bi(OH)_3$ and 8.6 g of $CrF_3.3H_2O$. In this case, composition of $Bi(OH)_3$ is 75 molar %. Calcination and main firing processes were effected completely as explained above regarding Example 1. The product phases ascertained by x-ray analysis were completely identical to the case of Sample 4 of Table 1 and there was no trace of not only $Bi(OH)_3$ which was one of the starting substances but also $Bi_2O_3$ which is a stable phase. Its absorption spectrum was also measured as in the case of Example 1. The result is shown in FIG. 5.

This sample was used with another metallic oxide for pressure formation. An outline of this experiment will be described next. An automatic mortar and a ball mill were used to crush 3.2 g of $SnO_2$, 0.8 g of the sample described above and 40 mg of $Mg(NO_3)_2.6H_2O$ and they were mixed uniformly (Step 12 of FIG. 1). Of this mixture, a 2.0 g portion was placed inside a hot press mold of alumina with inner diameter of 20 mm$\phi$ for pressure formation in air under one atmospheric pressure at 850° C. for 40 minutes with a weight of 942 kg (pressure of 300 kg/cm$^2$) (Step 13 of FIG. 1) to obtain a slightly yellowish disk-shaped form with thickness 1.9 mm, weight 1.95 g and specific weight about 3.3. Changes in its color tone were visually observed in the temperature range of 140° C. to 350° C. with the product placed on a heat plate. As a result, it was concluded that the changes in color tone were basically no different from the case of Example 1 although the product was not sufficiently satisfactory regarding characteristics of dependably following temperature and density of color tones. In other words, it was found that formation can be easily achieved if a stable metallic oxide which can be formed at a temperature below 850° C. is used as the base material and if this material and a small amount of agent for preventing sintering are added to it.

The reversible temperature indicating materials described in the Examples above have the following characteristics:

(1) Temperature indicating characteristics
  (a) They change reversibly from a green or yellowing tone to a yellow or red tone.
  (b) Various color tones can be freely selected by changing the compositional ratio between bismuth and chromium.
  (c) There is a visibly observable change at 140° C. They follow temperature changes dependably and their repetition lifetimes are sufficiently long.
(2) Characteristics related to various applications based on stability
  (a) They can withstand production processes in an oxidizing atmosphere and at relatively high temperatures.
  (b) The materials themselves can be directly mixed into a heat-resistant material such as ceramics and glass.
  (c) They can be made into a film on the surface of a target object by dispersing in water-soluble glass or a resin of all kinds or by melting or sintering according to the melting point of glass frit.
(3) Characteristics related to stability, safety and advantages in production
  (a) They are stable against moisture in air and ultraviolet light. They do not decompose or vaporize at temperatures under 850° C.
  (b) No substance harmful to human body is contained.
  (c) Materials themselves are relatively inexpensive and they can be produced by a simple production process.

In summary, the present invention discloses reversible temperature indicating materials which are chemically stable, are not harmful and can be produced relatively inexpensively.

What is claimed is:

1. In a method of indicating temperature by using a reversible temperature sensitive material, the improvement wherein said reversible temperature sensitive material includes a polycrystalline bismuth-chromium oxide substance produced by sintering a mixture with 50-86 molar % of bismuth-containing compounds and 50-14 molar % of chromium-containing compounds.

2. The method of claim 1 wherein said compounds are selected from a group consisting of oxides, hydroxides, halides, nitrates and organic compounds.

3. The method of claim 1 wherein said material is in the form of a film.

* * * * *